United States Patent [19]
Wilder

[11] Patent Number: 5,145,026
[45] Date of Patent: Sep. 8, 1992

[54] WATER FAUCET SILENCER APPARATUS

[76] Inventor: Harvey H. Wilder, 36 Catawba Cir., Hagerstown, Md. 21740

[21] Appl. No.: 670,183

[22] Filed: Mar. 15, 1991

[51] Int. Cl.⁵ .............................................. F16K 47/02
[52] U.S. Cl. .................................... 181/233; 181/258; 181/264; 181/266; 181/279
[58] Field of Search ............... 181/233, 264, 279, 281, 181/250, 258, 266, 267

[56] References Cited

U.S. PATENT DOCUMENTS

| | | | |
|---|---|---|---|
| 4,055,231 | 10/1977 | Martinez | 181/264 X |
| 4,314,621 | 2/1982 | Hansen | 181/233 |
| 4,497,388 | 2/1985 | Dexter | 181/233 |

Primary Examiner—L. T. Hix
Assistant Examiner—Khanh Dang
Attorney, Agent, or Firm—Leon Gilden

[57] ABSTRACT

An apparatus is set forth to limit differential pressure during opening of the water faucet, wherein the apparatus includes a housing with a series of spaced parallel diffuser plates mounting a diffuser medium therebetween, wherein the diffuser plates direct fluid flow coaxially of the plates to a surrounding cylindrical channel, and wherein the channel is directed forwardly of a forward solid end plate and through a directional cylinder into an associated water faucet.

6 Claims, 6 Drawing Sheets

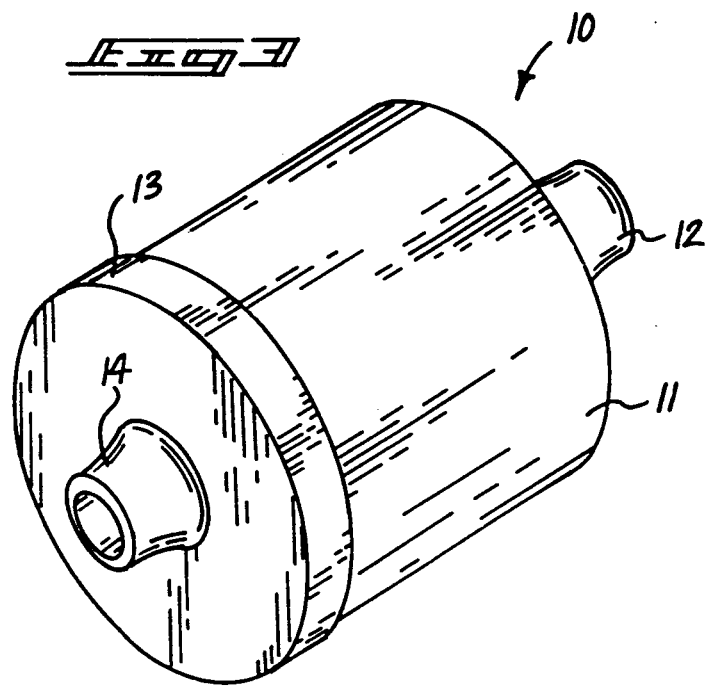
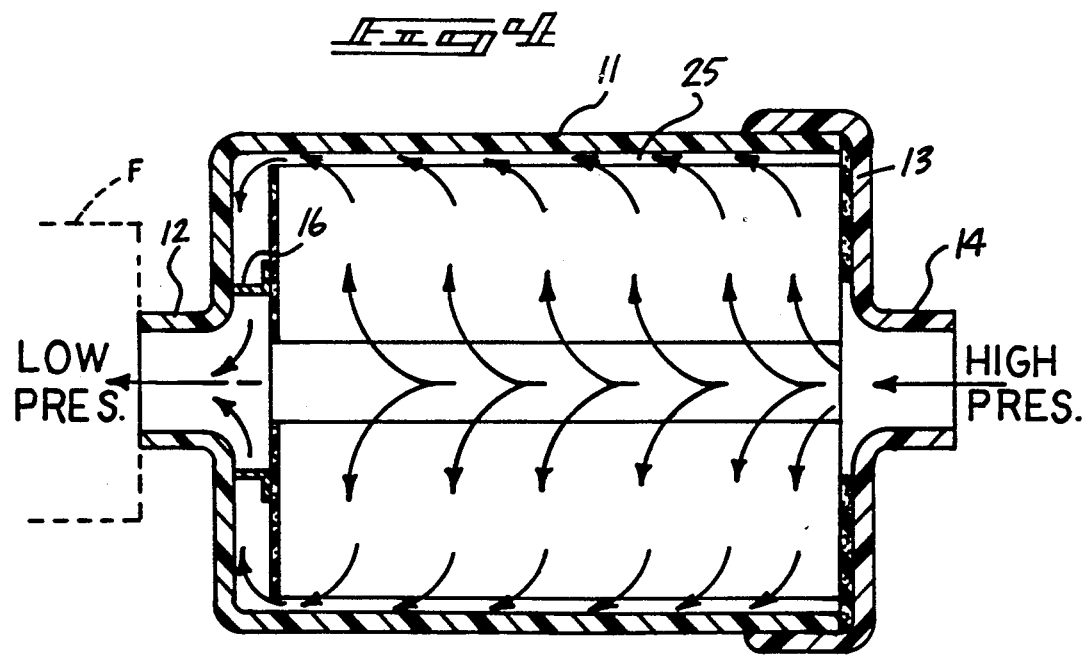

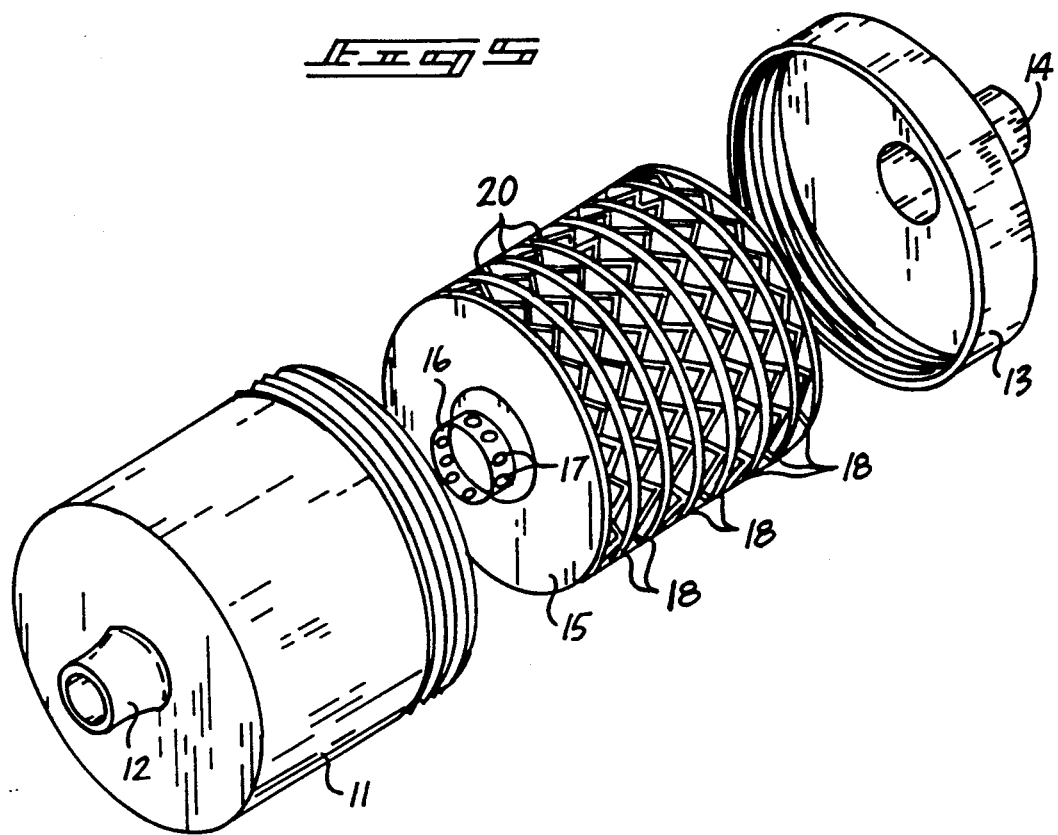
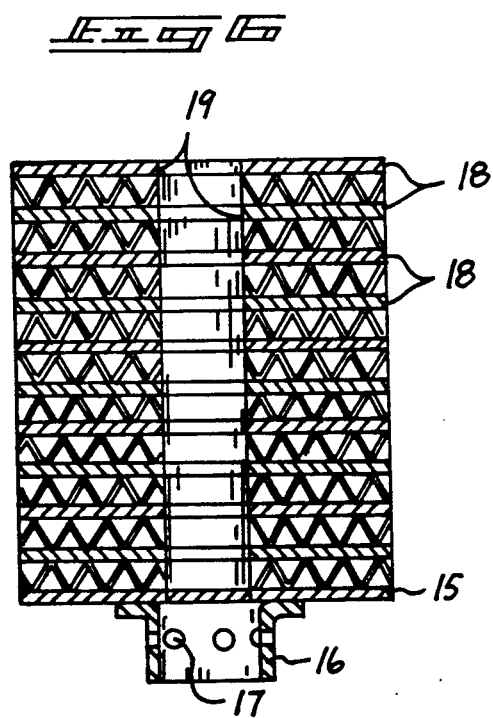

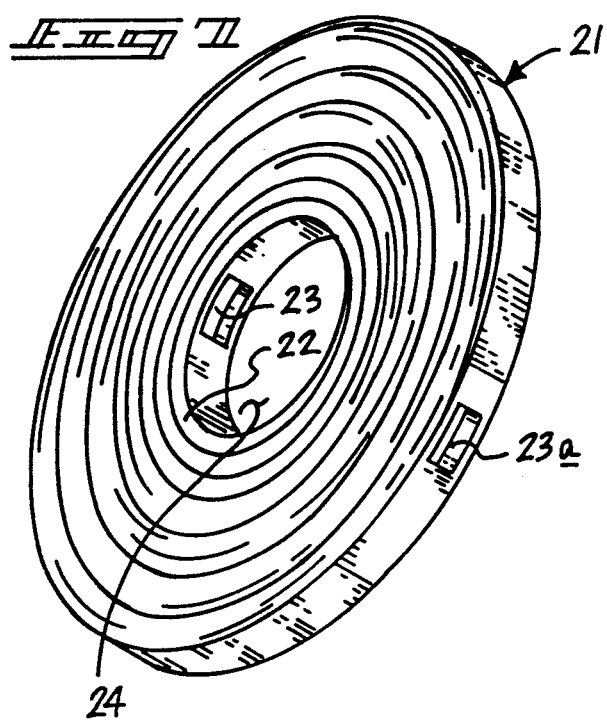
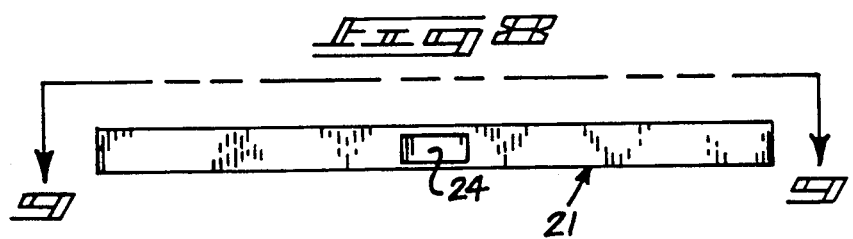
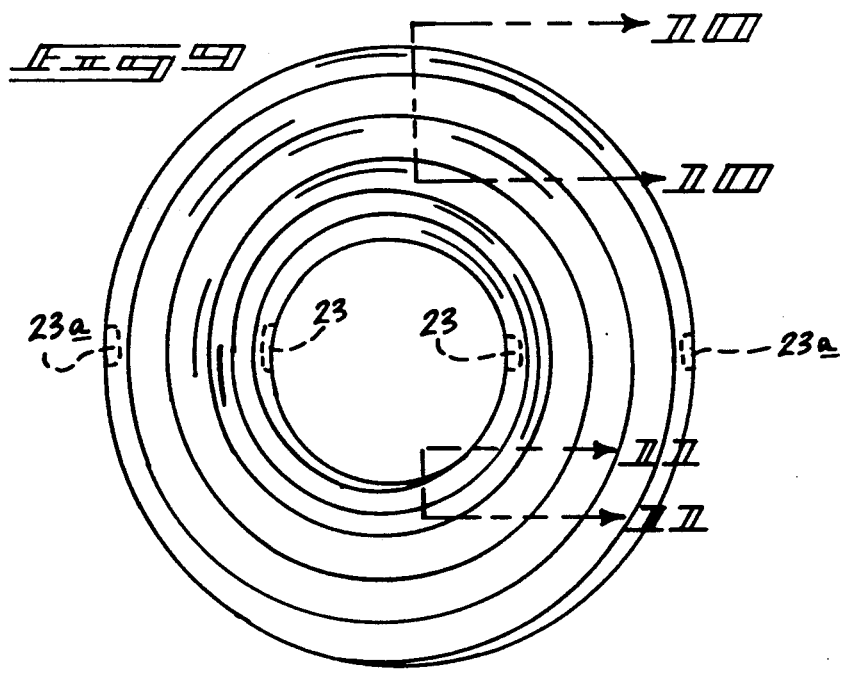

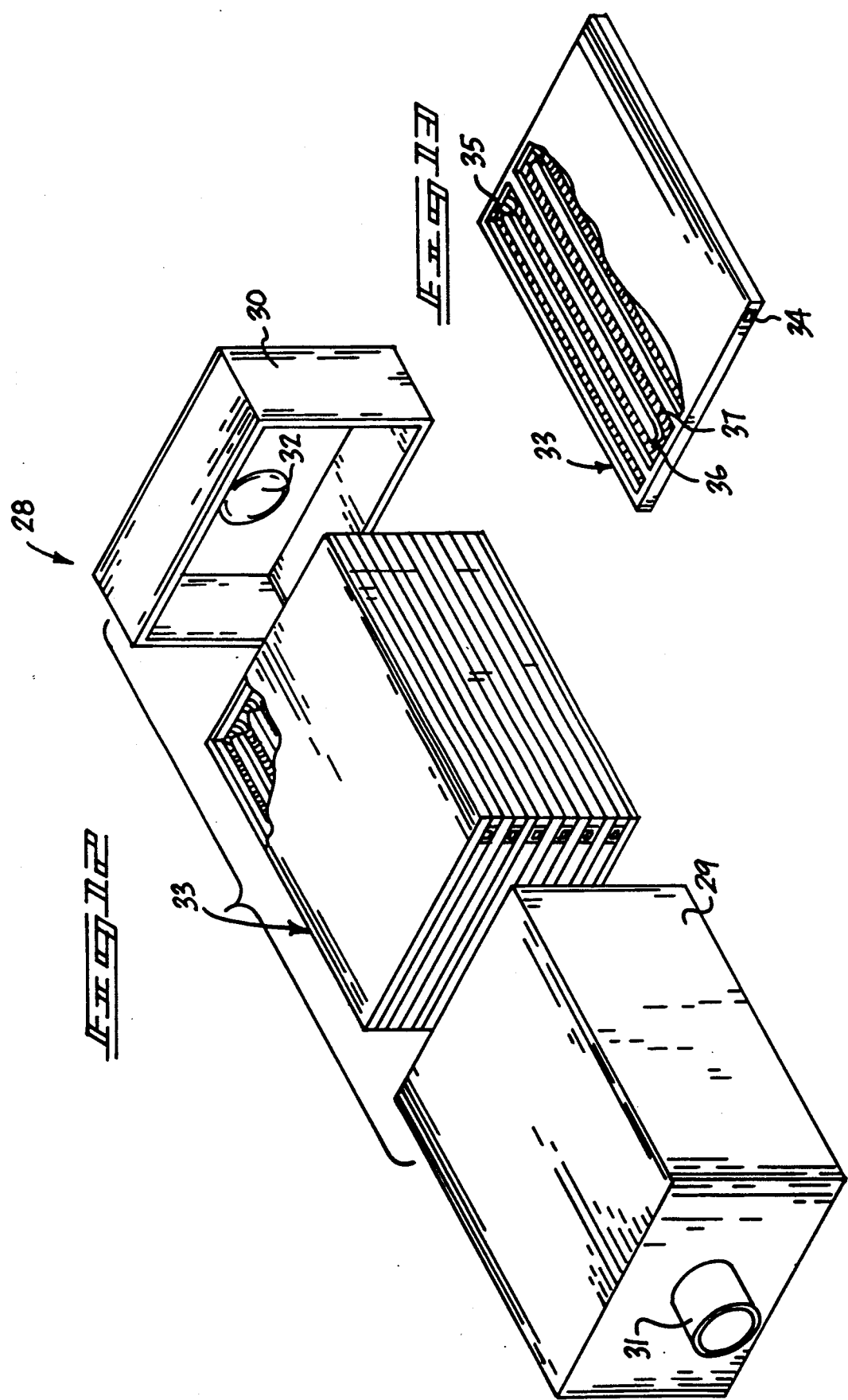

WATER FAUCET SILENCER APPARATUS

BACKGROUND OF THE INVENTION

1. Field of the Invention

The field of invention relates to fluid silencing organizations, and more particularly pertains to a new and improved water faucet silencer apparatus wherein the same limits pressure differential applied to an associated faucet during its opening.

2. Description of the Prior Art

Silencing devices in fluid flow have been utilized in the prior art to assist in dampening and attenuating various fluid mediums. An example of a prior art silencer device is in U.S. Pat. No. 4,314,621 to Hansen wherein an elongate, cylindrical silencer includes a central coaxially aligned flexible conduit, with surrounding baffling chambers.

U.S. Pat. No. 4,497,388 to Dexter sets forth the use of a central, flexible bladder that is pressurized and cooperates interiorly of a coaxially aligned housing.

U.S. Pat. No. 4,514,151 to Anders, et al. sets forth a device for dampening fluid pulses utilizing spaced chambers with an elongate housing.

U.S. Pat. No. 4,768,616 to Richard, et al. sets forth an acoustic filter for mounting upon a water pipe for observing pressure waves, wherein the central cylinder includes a central pipe with an inlet and outlet end, including diffuser rings mounted therewithin, with a deformable bag made from a flexible material mounted to an inlet and outlet end.

As such, it may be appreciated that there continues to be a need for a new and improved water faucet silencer apparatus as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of silencer apparatus now present in the prior art, the present invention provides a water faucet silencer apparatus wherein the same is arranged for mounting within a fluid or water line to dampen pulses by diffusion of pressure prior to the fluid reaching the faucet. As such, the general purpose of the present invention, which will be described subsequently in greater detail, is to provide a new and improved water faucet silencer apparatus which has all the advantages of the prior art silencer apparatus and none of the disadvantages.

To attain this, the present invention provides an apparatus to limit differential pressure during opening of the water faucet, wherein the apparatus includes a housing with a series of spaced parallel diffuser plates mounting a defusing medium therebetween, wherein the diffuser plates direct fluid flow coaxially of the plates to a surrounding cylindrical channel, and wherein the channel is directed forwardly of a forward solid end plate and through a directional cylinder into an associated water faucet.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved water faucet silencer apparatus which has all the advantages of the prior art silencer apparatus and none of the disadvantages.

It is another object of the present invention to provide a new and improved water faucet silencer apparatus which may be easily and efficiently manufacture and marketed.

It is a further object of the present invention to provide a new and improved water faucet silencer apparatus which is of a durable and reliable construction.

An even further object of the present invention is to provide a new and improved water faucet silencer apparatus which is susceptible of a low cost of manufacture with regard to both materials and labor, and which accordingly is then susceptible of low prices of sale to the consuming public, thereby making such water faucet silencer apparatus economically available to the buying public.

Still yet another object of the present invention is to provide a new and improved water faucet silencer apparatus which provides in the apparatuses and methods of the prior art some of the advantages thereof, while simultaneously overcoming some of the disadvantages normally associated therewith.

Still another object of the present invention is to provide a new and improved water faucet silencer apparatus wherein the same is arranged for mounting in line with an associated water conduit to defuse water pressure directed therethrough dampening pulses directed at the water faucet during its opening.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an isometric illustration of the instant invention.

FIG. 4 is an orthographic cross-sectional illustration of the instant invention.

FIG. 5 is an isometric exploded illustration of the instant invention.

FIG. 6 is an orthographic cross-sectional illustration of the internal components of the invention.

FIG. 7 is a modified diffuser plate utilized by the instant invention.

FIG. 8 is an orthographic end view of the diffuser plate as illustrated in FIG. 7.

FIG. 9 is an orthographic top view of the diffuser plate as illustrated in FIG. 7.

FIG. 12 is an exploded isometric illustration of a modified silencer apparatus utilized by the instant invention.

FIG. 13 is an isometric illustration of a modified diffuser plate utilized by the invention, as set forth in FIG. 12.

DESCRIPTION OF THE PREFERRED EMBODIMENT

Figure 1:
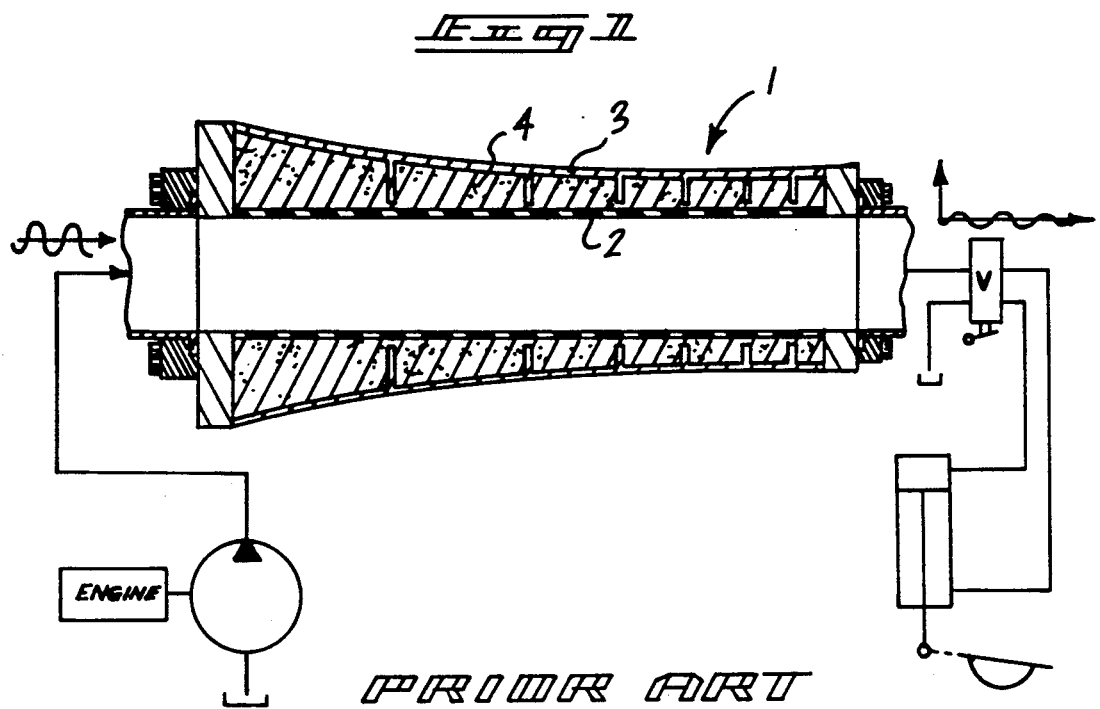
FIG. 1 is an orthographic side view of a prior art fluid silencer apparatus.

With reference now to the drawings, and in particular to FIGS. 1 to 12 thereof, a new and improved water faucet silencer apparatus embodying the principles and concepts of the present invention and generally designated by the reference numeral 10 will be described.

Figure 2:
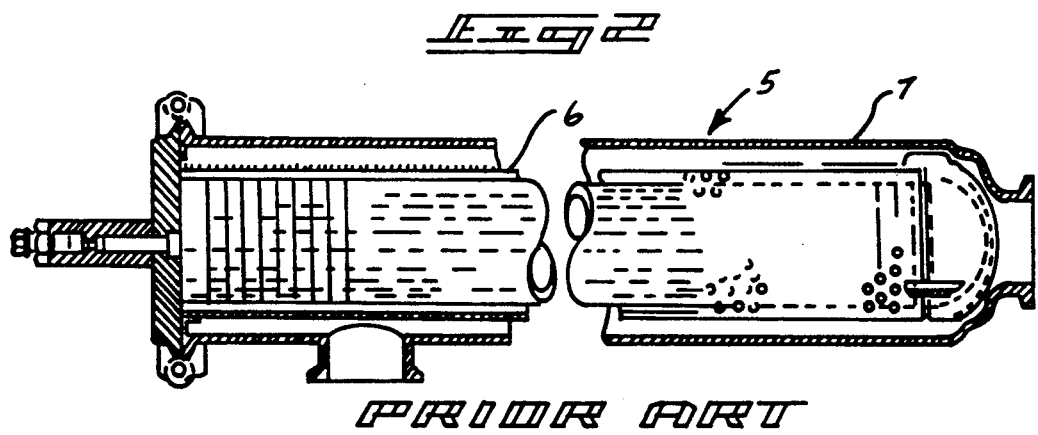
FIG. 2 is an orthographic cross-sectional configuration of a further example of a fluid silencer apparatus.
Figure 10:
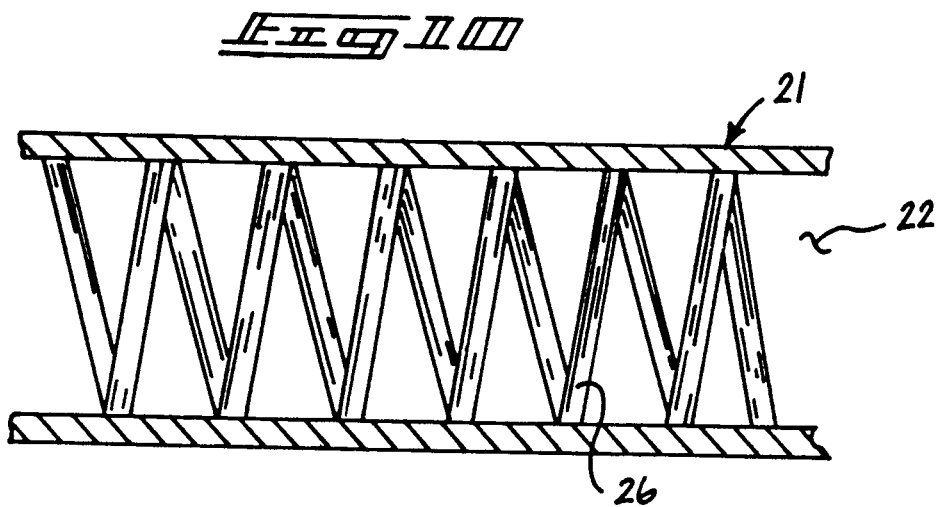
FIG. 10 is an orthographic view, taken along the lines 10—10 of FIG. 9 in the direction indicated by the arrows.
Figure 11:
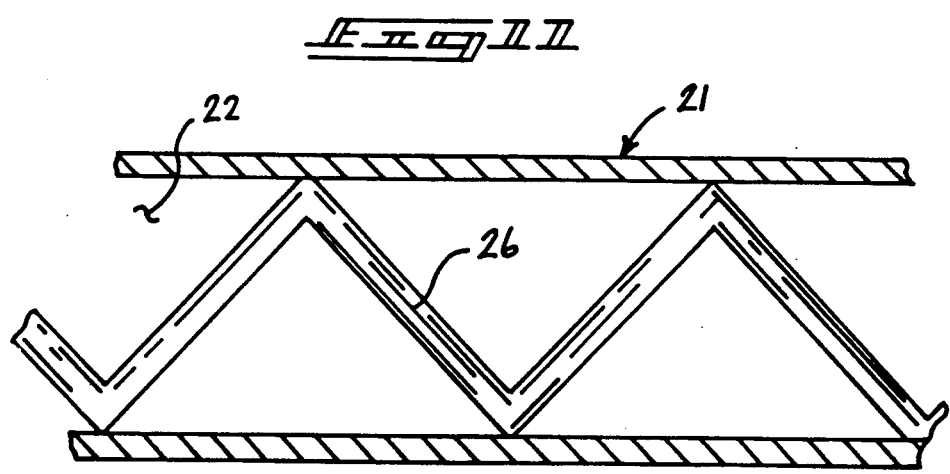
FIG. 11 is an orthographic view, taken along the lines 11—11 of FIG. 9 in the direction indicated by the arrows.

FIG. 1 illustrates a prior art fluid silencer apparatus 1, wherein an exterior tapered housing 3 includes a central flexible bladder 2 with surrounding chambers 4 positioned thereabout for effecting dampening of fluid directed through the apparatus, as set forth in U.S. Pat. No. 4,314,621. FIG. 2 illustrates a further prior art fluid silencer apparatus 5, wherein a central bladder 6 is positioned within a housing 7 to effect dampening of fluid directed through the bladder, in a manner as set forth in U.S. Pat. No. 4,497,388.

More specifically, the water faucet silencer apparatus 10 of the instant invention essentially comprises an axially aligned cylindrical housing 11 defined by a predetermined internal diameter that includes a coaxially aligned exit conduit 12, and a coaxially aligned entrance conduit 14, wherein the entrance conduit 14 is mounted through a removable cover 13 that is selectively removable from the housing 11 to provide maintenance of the components positioned therewithin. The baffling system of the housing includes a solid rigid end plate 15 spaced from an internal relationship relative to the exit conduit 12, with the directional cylinder 16 coaxially mounted to a forward end of the end plate 15, wherein the directional cylinder 16 includes a series of apertures 17 directed through the directional cylinder 16. The directional cylinder 16 is defined by a second diameter, as opposed to a first diameter defined by the exit conduit 12, wherein the second diameter is at least equal to or greater than the first diameter to provide a surrounding relationship relative to the first diameter and its direction of fluid flow through the aperture 17 of the directional cylinder 16 to permit fluid to gain access to the exit conduit 12. A series of parallel and equally spaced cylindrical diffuser plates 18 are arranged coextensively and rearwardly of the end plate 15 to the end wall of the housing 11 containing the entrance conduit 14. The diffuser plates 18 each include a diffuser plate bore coaxially aligned through each plate, and with the housing 11. The diffuser plates equally spaced contain a series of cylindrical corrugated diffuser panel members, wherein the corrugation defined channels radially directed relative to the bores of the plates 18 and of associated bores of each of the diffuser panels 20 to direct fluid flow axially of the housing 11 to a surrounding cylindrical channel 25. Accordingly, the diffuser plates are of a diameter less than that defined by the predetermined internal diameter of the cylindrical housing 11.

FIGS. 7-11 set forth the use of a modified diffuser plate 21 utilized in lieu of each of the diffuser plates 18 that includes a single spiral channel 22. Each modified diffuser plate 21 includes a plate central bore 24, with a plurality of entrance windows 23 positioned in fluid communication with each plate central bore 24. The fluid is spirally directed about the single spiral channel 22 and exteriorly of the modified diffuser plate 21 from exit windows 23a mounted about circumferential peripheral surface of the modified diffuser plate 21. Interiorly of the single spiral channel 22, a spiral baffle 26 of a first coiled density (defined by coils per inch) is greater at the outer rings of the single channel 22, wherein the baffle 26 is of less density at the entrance spirals of the single channel, wherein the baffle accordingly changes density in its positioning through the diffuser plate, as illustrated.

FIGS. 12 and 13 illustrate the use of a modified organization, wherein a modified silencer apparatus 28 includes a housing 29 and an end cap 30 mounted thereon. The housing 29 includes an inlet conduit 31 coaxially aligned with an outlet conduit 32. A series of diffuser plate members 33 are complimentarily received within the housing and end caps 29 and 30 when in an assembled configuration. Each of the diffuser plate members 33 includes a plate inlet 34 and a plate outlet 35 formed at opposed end surfaces of each plate member. A single serpentine path fluidly intercommunicates the inlet 34 to the outlet 35, wherein the serpentine path includes a series of parallel equally spaced cylindrical grooves coextensively directed throughout the serpentine path 36 to effect silencing of fluid directed therethrough.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A water faucet silencer apparatus comprising, a cylindrical housing, the cylindrical housing including a coaxially aligned entrance conduit and a coaxially aligned exit conduit, a forward plate positioned within the housing and adjacent the entrance conduit and a rear plate positioned within the housing adjacent the exit conduit, the entrance conduit is mounted to the forward plate of the housing, with the exit conduit mounted to the rear plate of the housing, and the cylindrical housing defining a predetermined internal diameter, and a solid rigid end plate spaced from and parallel the rear plate of the housing, with an apertured directional cylinder coaxially mounted within the housing and the end plate in surrounding relationship relative to the exit conduit, and a baffling means mounted within the housing between the end plate and the forward plate for directing fluid flow from the entrance conduit to the directional cylinder, and the baffling means defined by a predetermined external diameter less than the predetermined internal diameter to define a cylindrical channel between the baffling means and the cylindrical housing, and the baffling means includes a plurality of parallel equally spaced diffuser plates, each diffuser plate includes a coaxially aligned bore, and a diffuser panel member mounted coextensively between the diffuser plates.

2. An apparatus as set forth in claim 1 wherein each diffuser panel member is defined as a continuous cylindrical corrugated member defining radial channels from each diffuser panel bore to the cylindrical channel.

3. An apparatus as set forth in claim 1 wherein each diffuser panel member includes a single spiral channel, and each diffuser panel member is defined by a diffuser panel diameter substantially equal to the predetermined external diameter, and each diffuser panel member includes a central diffuser panel bore, with a plurality of entrance windows in fluid communication between the single spiral channel and the diffuser panel bore, and a plurality of exit windows formed through a peripheral surface of each diffuser panel member in fluid communication with the cylindrical channel.

4. An apparatus as set forth in claim 3 wherein the single spiral channel includes a spiral baffle positioned therewithin.

5. An apparatus as set forth in claim 4 wherein the single spiral channel further includes a corrugated baffle cooperative with the spiral baffle, wherein the spiral baffle and the corrugated baffle are coextensively directed through the single spiral channel.

6. An apparatus as set forth in claim 5 wherein the spiral baffle is defined by a discontinuous spiral directed throughout the spiral channel, including first predetermined spiral density defined by spirals per linear inch adjacent each entrance window and terminating in a second spiral density adjacent each exit window, wherein the second spiral density is greater than the first spiral density.

* * * * *